US008708806B2

(12) United States Patent
Wabschall et al.

(10) Patent No.: US 8,708,806 B2

(45) Date of Patent: Apr. 29, 2014

(54) GAMING SYSTEM, METHOD, AND PROGRAM PRODUCT FOR CONTROLLING A FREE PLAY SEQUENCE IN A WAGERING GAME

(71) Applicants: Michael Wabschall, Austin, TX (US); Brian Watkins, Austin, TX (US); Natasha Haggard, Austin, TX (US)

(72) Inventors: Michael Wabschall, Austin, TX (US); Brian Watkins, Austin, TX (US); Natasha Haggard, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 50 days.

(21) Appl. No.: 13/629,866

(22) Filed: Sep. 28, 2012

(65) Prior Publication Data

US 2014/0094271 A1 Apr. 3, 2014

(51) Int. Cl.
*A63F 13/00* (2006.01)

(52) U.S. Cl.
USPC .................................. 463/25; 463/20; 463/27

(58) Field of Classification Search
USPC .......................................... 463/16–20, 25, 27
See application file for complete search history.

(56) References Cited

U.S. PATENT DOCUMENTS

| | | | | |
|---|---|---|---|---|
| 5,513,846 | A | 5/1996 | Niederlein et al. | |
| 5,980,384 | A | 11/1999 | Barrie | |
| 6,190,255 | B1 | 2/2001 | Thomas et al. | |
| 6,322,309 | B1 | 11/2001 | Thomas et al. | |
| 6,645,074 | B2 | 11/2003 | Thomas et al. | |
| 6,755,737 | B2 | 6/2004 | Jackson et al. | |
| 6,905,412 | B2 | 6/2005 | Thomas et al. | |
| 7,520,809 | B2 | 4/2009 | Thomas et al. | |
| 7,901,283 | B2 | 3/2011 | Thomas et al. | |
| 2003/0064797 | A1 * | 4/2003 | Jackson et al. | 463/25 |
| 2008/0139285 | A1 * | 6/2008 | Zimmermann | 463/20 |
| 2012/0115599 | A1 | 5/2012 | Conway et al. | |

* cited by examiner

*Primary Examiner* — Ronald Laneau
*Assistant Examiner* — Ross Williams
(74) *Attorney, Agent, or Firm* — Russell D. Culbertson, Esq.; JP Cody, Esq.

(57) ABSTRACT

A method provides a secondary game for controlling free plays awarded in a wagering game conducted through a gaming machine. Once results are displayed for a number of free plays awarded in the wagering game, a secondary game is conducted and the outcome of the secondary game may award additional free plays. Once results for the additional free plays are displayed, the secondary game is conducted again and the outcome of the secondary game may award yet more free plays. Each instance of the secondary game may include a result that does not trigger additional free plays and thus may end the play sequence at the gaming machine.

20 Claims, 7 Drawing Sheets

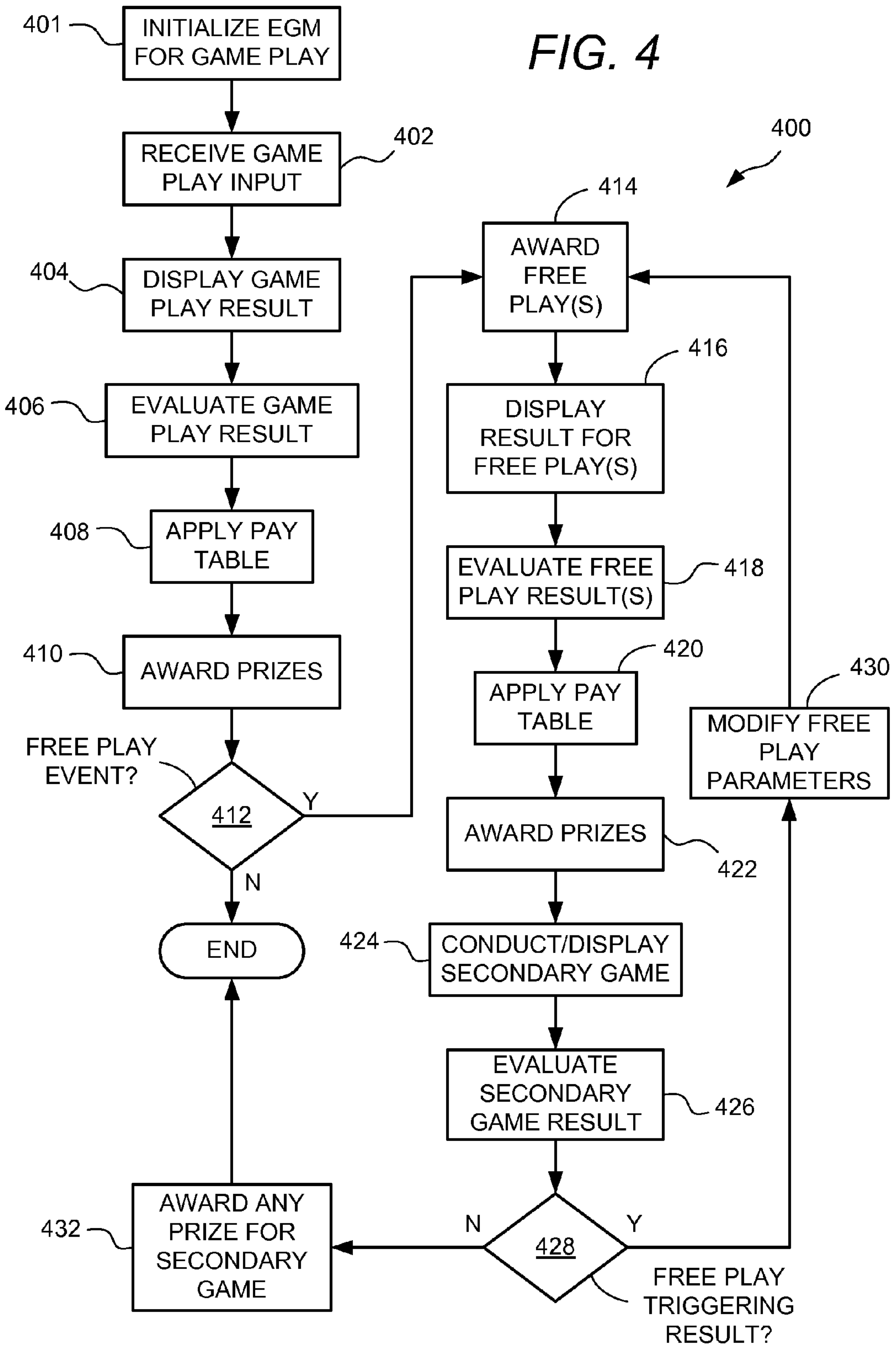
FIG. 4
400
401
INITIALIZE EGM FOR GAME PLAY
402
RECEIVE GAME PLAY INPUT
404
DISPLAY GAME PLAY RESULT
406
EVALUATE GAME PLAY RESULT
408
APPLY PAY TABLE
410
AWARD PRIZES
FREE PLAY EVENT?
412
Y
N
END
414
AWARD FREE PLAY(S)
416
DISPLAY RESULT FOR FREE PLAY(S)
418
EVALUATE FREE PLAY RESULT(S)
420
APPLY PAY TABLE
422
AWARD PRIZES
424
CONDUCT/DISPLAY SECONDARY GAME
426
EVALUATE SECONDARY GAME RESULT
428
N
Y
FREE PLAY TRIGGERING RESULT?
430
MODIFY FREE PLAY PARAMETERS
432
AWARD ANY PRIZE FOR SECONDARY GAME

GAMING SYSTEM, METHOD, AND PROGRAM PRODUCT FOR CONTROLLING A FREE PLAY SEQUENCE IN A WAGERING GAME

BACKGROUND OF THE INVENTION

1. Field of the Invention

The present invention relates to wagering games, gaming machines, gaming systems, program products for such gaming machines and gaming systems, and associated methods. More particularly, the invention relates to the manner in which free plays are conducted in wagering games.

2. Description of the Related Art

Numerous types of wagering games have been developed to provide players with new and varied gaming experiences. One of the techniques which has been used to increase player interest in wagering games is to provide types of prizes in addition to credit, cash, or merchandise prizes. For example, U.S. Pat. No. 5,980,384 discloses a gaming machine that offers a bonus game in addition to the regular prizes in a primary game. Free plays may also be awarded in a wagering game. U.S. Pat. No. 5,513,846 discloses a gaming machine which may award one or more free plays of the game in addition to providing other types of prizes.

There remains a need in the field of wagering games to provide gaming machines and methods which capture and maintain the player's interest.

SUMMARY OF THE INVENTION

The present invention encompasses methods, apparatus, and program products for controlling free plays awarded in a wagering game conducted through a gaming machine. According to some forms of the invention, once results are displayed for a number of free plays awarded in the wagering game, a secondary game is conducted and the outcome of the secondary game may or may not award additional free plays. If additional fee plays are won in the first instance of the secondary game, results are displayed for the additional free plays and then the secondary game is conducted again. The outcome of this next instance of the secondary game again may or may not award additional free plays. The use of the secondary game to award additional free plays generates excitement for the player because once the game starts a sequence of free plays, the player understands that there is a chance of having an unlimited number of free plays to increase the player's winnings at the gaming machine. As used in this disclosure and the accompanying claims a "free play" which is awarded in a game play sequence comprises an activation of a wagering game to obtain a result in the game where the activation does not require a wager aside from any wager required to initiate the game play sequence.

A method according to some forms of the invention includes receiving a wager for a play in the wagering game and displaying a result for the play in the game. The wager is received through a player input system of the gaming machine and the result for the play is displayed through a display system for the gaming machine. In response to a free play triggering event in the play in the wagering game, the method includes awarding one or more free plays of the wagering game, each free play requiring no wager. Once free plays are awarded for a play of the game, a respective result may then be displayed at the gaming machine display system for each of the free plays until results have been shown for all of the free plays. Preferably after all of the free play results have been displayed, the method includes displaying a secondary game and a result for this secondary game through the display system. Among the potential results available for the secondary game are at least one additional free play triggering result and at least one result that does not trigger additional free plays. Where the result of the secondary game is an additional free play triggering result, the method includes awarding one or more additional free plays of the wagering game and then repeating the sequence of displaying the free play results and conducting the secondary game, which again may award yet more free plays. In this way, with at least one potential result in the secondary game awarding more free plays, it is possible for the free plays to continue indefinitely. However, the wagering game play sequence ends when the result for the secondary game is a result which does not trigger additional free plays. The method also includes awarding a prize at the gaming machine for each winning aspect of the result displayed for the original play of the wagering game and for each respective free play result. The various winning aspects of the results may be defined in a pay table for the wagering game.

A gaming machine according to one embodiment of the present invention includes a display system including at least one display device, a player input system, and at least one processor. One or more memory devices are associated with the processor or processors for storing instructions which are executable to receive the wager for a play in a wagering game, cause the result to be displayed for that game, conduct free plays in response to a free play trigger in the wagering game, and then provide the secondary game cycle described above to give the player the chance for additional free plays to extend the free play sequence. Ultimately, the stored instructions are also executed to award a prize for each winning aspect of each result displayed in the original game play and any free plays which have been conducted.

Considering that the present invention may be implemented using one or more general purpose processing devices, the invention also encompasses a program product which may be stored on one or more tangible computer readable data storage devices representing non-transitory media. The program product may include player input program code, primary game program code, secondary game program code, and payout program code. The player input program code is executable to receive the game play input for a play of the game, while the primary game program code is executable to conduct the original play in the wagering game and any free plays which may be awarded. The secondary game program code is executable to conduct the instance or instances of the secondary game and either award additional free plays or end the sequence of free plays as described in the method above. The payout program code included in a program product embodying the principles of the invention may be executable to award a prize for each winning aspect of the result for the original game play and any free plays in the sequence of game play.

These and other advantages and features of the invention will be apparent from the following description of illustrative embodiments, considered along with the accompanying drawings.

BRIEF DESCRIPTION OF THE DRAWINGS

FIG. 4 is a flow diagram illustrating a process flow according to one or more embodiments of the present invention.

DESCRIPTION OF ILLUSTRATIVE EMBODIMENTS

In the following description, FIGS. 1-3 will be used to describe example gaming machines and gaming networks through which the present invention may be implemented. Processes which are illustrative of certain embodiments of the invention will then be described in connection with the flow chart of FIG. 4. A reel-type game embodying the principles of the invention will then be described in connection with FIGS. 5-8.

Figure 1:
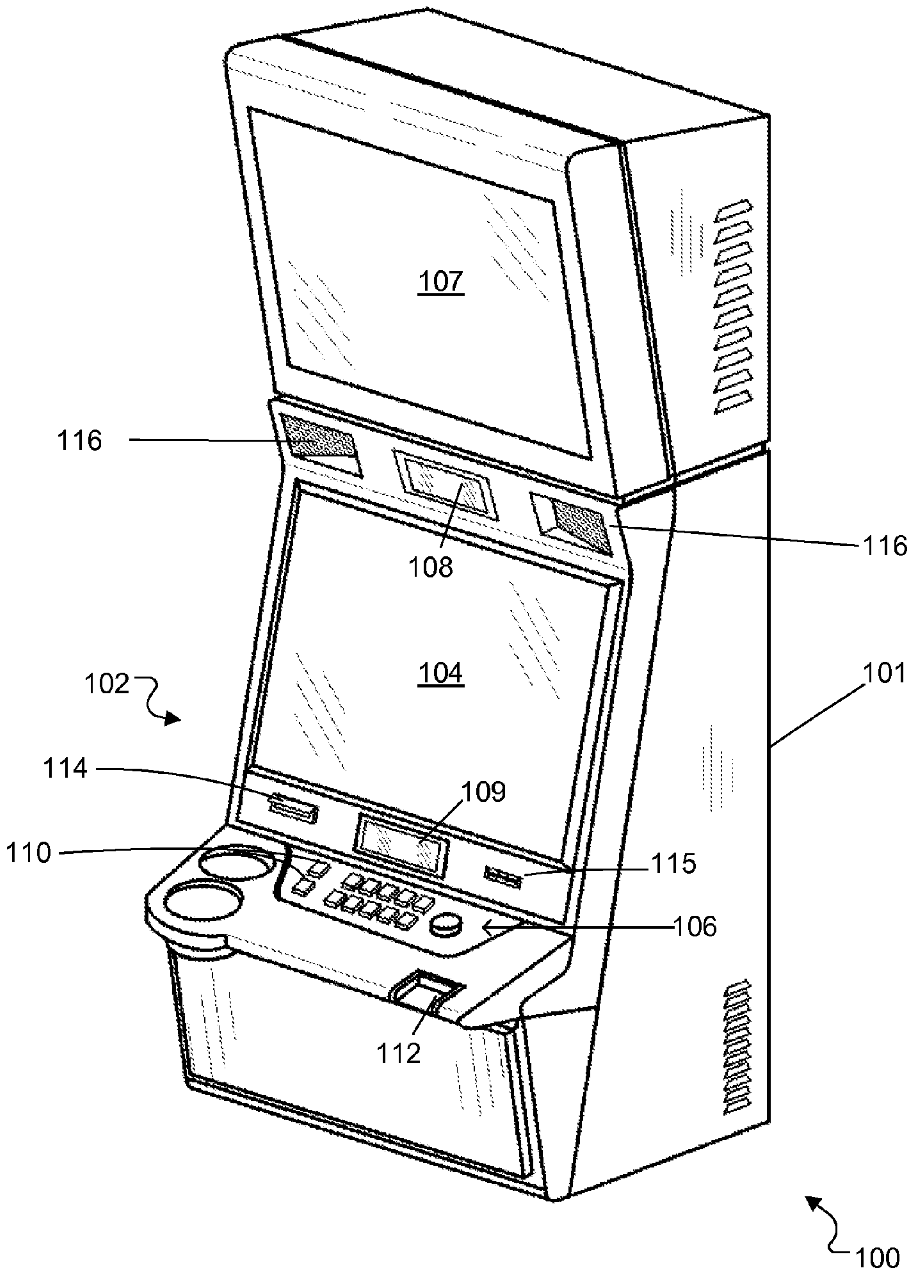
FIG. 1 is a view in perspective of the front of a gaming machine which may be employed in embodiments of the present invention.

FIG. 1 shows a gaming machine 100 that may be used in implementing a game providing free play control according to the present invention. The block diagram of FIG. 2 shows further details of gaming machine 100 along with certain variations which may be included in the gaming machine. FIG. 3 shows an example gaming network in which gaming machines such as gaming machine 100 may be employed.

Referring to FIG. 1, gaming machine 100 includes a cabinet 101 having a front side generally shown at reference numeral 102. A primary video display device 104 is mounted in a central portion of the front side 102, with a button panel 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future. One or more of these video display devices, and especially primary video display device 104, may be used to display game symbols which show the results for a given play of the game implemented through gaming machine 100. Such results may be shown by the manner in which game symbols are aligned along various paylines defined through a symbol location matrix presented by the display device. As will be described further below in connection with FIG. 2 and elsewhere, it is also possible for gaming machines within the scope of the present invention to include mechanical elements such as mechanical reels. Generally, the display device or display devices of the gaming machine, whether video display devices, mechanical devices, or combinations of the two, which are used to display the game symbol matrices according to embodiments of the invention, may be described in this disclosure and the accompanying claims as a display system.

The gaming machine 100 illustrated for purposes of example in FIG. 1 also includes a number of mechanical control buttons 110 mounted on button panel 106. These control buttons 110 may allow a player to select a bet level, select paylines, select a type of game or game feature, and start a play in a game. Other forms of gaming machines through which the invention may be implemented may include switches, joysticks, or other mechanical input devices, and/or virtual buttons and other controls implemented on a suitable touch screen video display. For example, primary video display device 104 in gaming machine 100 provides a convenient display device for implementing touch screen controls in addition to or in lieu of mechanical controls. The player interface devices which receive player inputs to initiate the play of a game through the gaming machine, such as controls to select a wager amount for a given play and controls to actually start a given play, may be referred to generally as a player input system.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Numerous other types of player interface devices may be included in gaming machines that may be used to implement embodiments of the present invention.

A gaming machine which may be used to implement embodiments of the present invention may also include a sound system to provide an audio output to enhance the user's playing experience. For example, illustrated gaming machine 100 includes speakers 116 which may be driven by a suitable audio amplifier to provide a desired audio output at the gaming machine.

Figure 2:
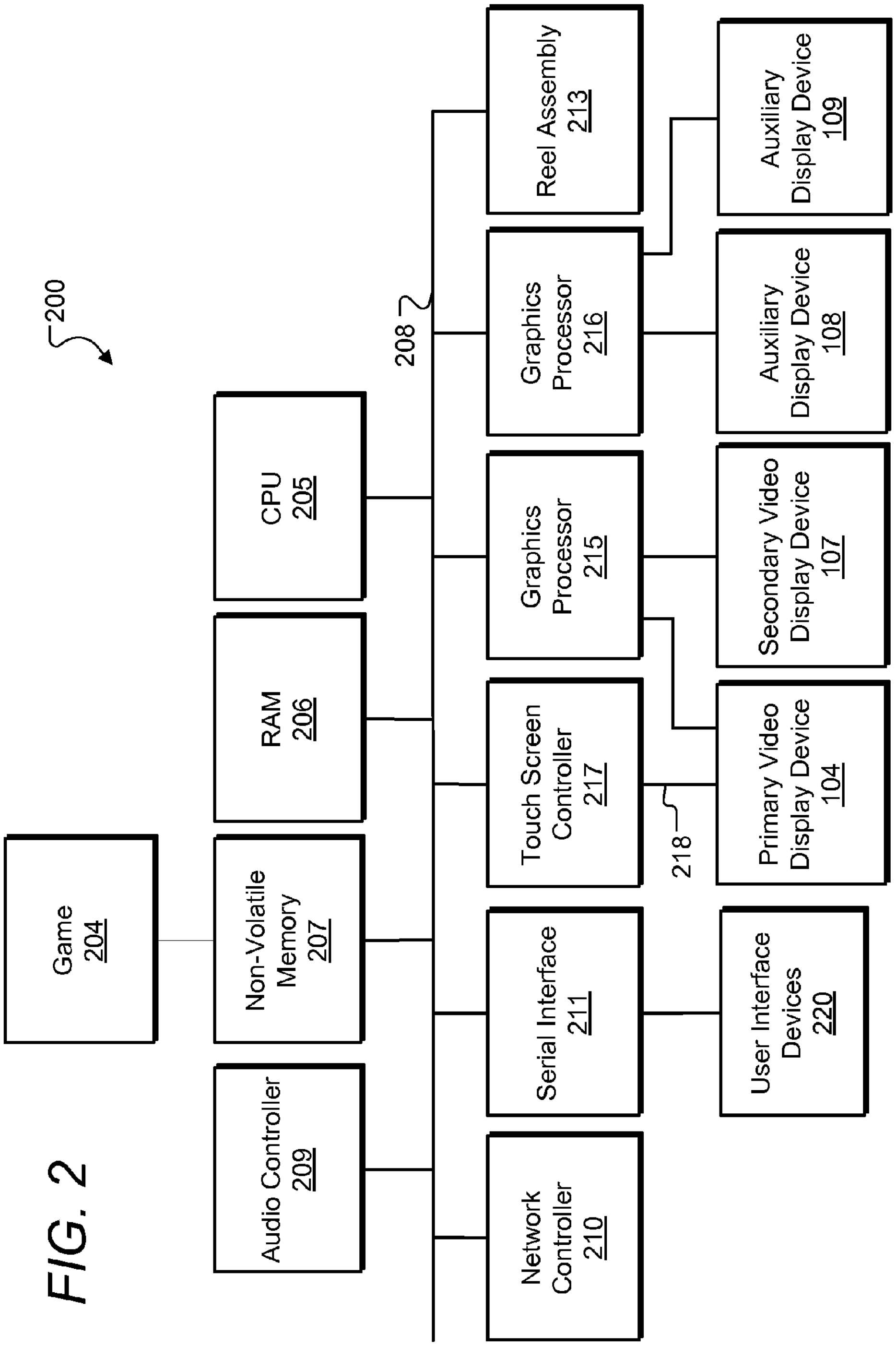
FIG. 2 is a diagrammatic representation of the gaming machine shown in FIG. 1 showing various components of the gaming machine.

FIG. 2 shows a logical and hardware block diagram 200 of gaming machine 100 which includes a central processing unit (CPU) 205 along with random access memory (RAM) 206 and nonvolatile memory or storage device 207. All of these devices are connected on a system bus 208 with an audio controller device 209, a network controller 210, and a serial interface 211. A graphics processor 215 is also connected on bus 208 and is connected to drive primary video display device 104 and secondary video display device 107 (both mounted on cabinet 101 as shown in FIG. 1). A second graphics processor 216 is also connected on bus 208 in this example to drive the auxiliary display devices 108 and 109 also shown in FIG. 1. As shown in FIG. 2, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself typically comprises a thin film that is secured over the display surface of the respective display device, in this case primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer. These elements may be mounted on a standard personal computer chassis and housed in a standard personal computer housing which itself may be mounted in cabinet 101 shown in FIG. 1. Alternatively, the various electronic components may be mounted on one or more circuit boards housed within cabinet 101 without a separate enclosure such as those found in personal computers. Those familiar with data processing systems and the various data processing elements shown in FIG. 2 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 2 as being connected directly on system bus 208 may in fact communicate with the other system components through a suitable expansion bus. Audio controller 209, for example, may be connected to the system via a PCI or PCIe bus. System bus 208 is shown in FIG. 2 merely to indicate that the various components are connected in some fashion for communication with CPU 205 and is not intended to limit the invention to any particular bus architecture. Numerous other variations in the gaming machine internal structure and system may be used without departing from the principles of the present invention. For example, a gaming machine in some embodiments of the present invention may rely on one or more data processors which are located remotely from the gaming machine itself. Embodiments of the present invention may include no processor such as CPU 205 or graphics processors such as 215 and 216 at the gaming machine, and may instead rely on one or more remote processors. Thus unless specifically stated otherwise, the designation "gaming machine" is used in this disclosure and the accompanying claims to designate a system of devices which operate together to provide the indicated functions. A "gaming machine" may include a gaming machine such as gaming machine 100 shown in FIGS. 1 and 2, which is itself a system of various components, and may also include one or more components remote from a gaming machine cabinet (such as cabinet 101 in FIG. 1). Thus the designation "gaming machine" encompasses both a stand-alone gaming machine and a gaming machine (that is, the part housed in a cabinet such as cabinet 101 in FIG. 1) along with one or more remote components for providing various functions (such as generating outcomes for plays in a game, and driving display devices mounted in a gaming machine cabinet).

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, CPU 205 or a graphics processor packaged with or included with CPU 205 may control all of the display devices directly without any separately packaged graphics processor. The invention is not limited to any particular arrangement of processing devices for controlling the video display devices included with gaming machine 100. Also, a gaming machine implementing the present invention is not limited to any particular number of video display devices or other types of display devices.

In the illustrated gaming machine 100, CPU 205 executes software, that is, program code, which ultimately controls the entire gaming machine including the receipt of player inputs and the presentation of the graphics or information displayed according to the invention through the display devices 104, 107, 108, and 109 associated with the gaming machine. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for game software such as program code 204 (which may include player input program code, primary game program code, secondary game program code, and payout program code) prior to loading into random access memory 206 for execution, or for programs not in use or for other data generated or used in the course of gaming machine operation. Network controller 210 provides an interface to other components of a gaming system in which gaming machine 100 may be included. An example network will be described below in connection with FIG. 3.

It should be noted that the invention is not limited to gaming machines employing the personal computer-type arrangement of processing devices and interfaces shown in example gaming machine 100. Other gaming machines through which the invention may be implemented may include one or more special purpose processing devices to perform the various processing steps for implementing the invention. Unlike general purpose processing devices such as CPU 205, which may comprise an Intel Pentium® or Core® processor for example, these special purpose processing devices may not employ operational program code to direct the various processing steps.

The example gaming machine 100 which may be used to implement some embodiments of the present invention is shown in FIG. 2 as including user interface devices 220 (part of a player input system) connected to serial interface 211. These user interface devices may include various player input devices such as mechanical buttons shown on button panel 106 in FIG. 1, and/or levers, and other devices. It will be appreciated that the interface between CPU 205 and other player input devices such as player card readers, voucher readers or printers, and other devices may be in the form of serial communications. Thus serial interface 211 may be used for those additional devices as well, or the gaming machine may include one or more additional serial interface controllers. However, the interface between peripheral devices in the gaming machine, such as player input devices, is not limited to any particular type or standard for purposes of the present invention.

Reel Assembly 213 is shown in the diagrammatic representation of FIG. 2 to illustrate that a gaming machine which may be used for various embodiments of the invention may include mechanical reels. For example, a set of mechanical reels may replace the primary display device 104, or at least part of that display device. Alternatively, mechanical reels may be included in the gaming machine behind a light-transmissive video display panel. In either case, the mechanical reels represent a display device for displaying some or all of the game symbols in the course of a game play. Although the invention is not limited to any particular mechanical reel arrangement or control system, mechanical reels may be controlled conveniently through serial communications which provide instructions for a respective stepper motor for each reel. Thus some embodiments of the present invention which employ mechanical reels may use a serial interface device such as serial interface 211 to control communications with the reel assembly, and may not include a direct bus interconnection as indicated by FIG. 2. Details of a mechanical reel arrangement and various accent lighting arrangements which may be associated with mechanical reels are not shown in the present figures so as to avoid obscuring the present invention in unnecessary detail.

Figure 3:
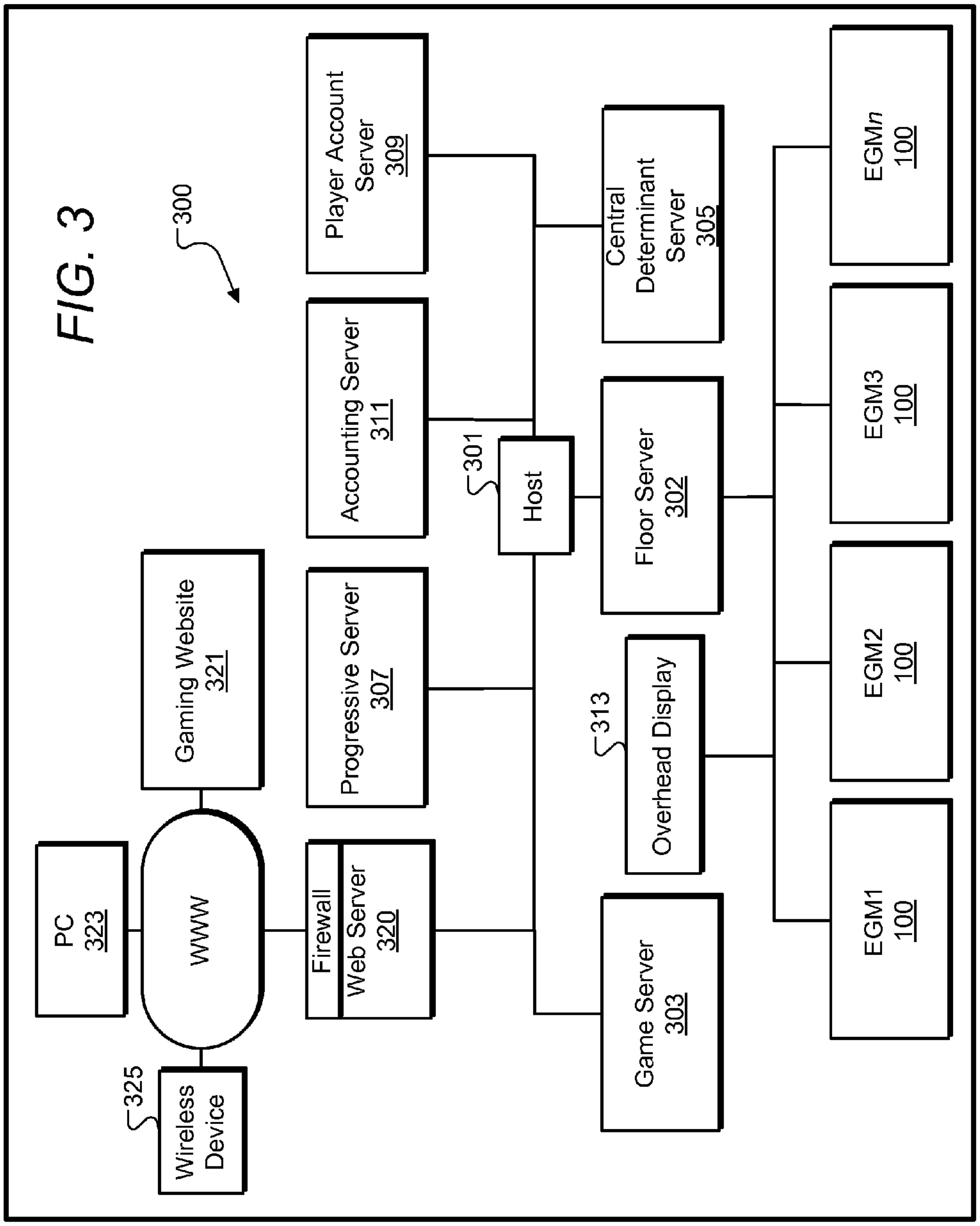
FIG. 3 is a diagrammatic representation of a gaming network in which the present invention may be implemented.

Referring now to FIG. 3, a networked gaming system 300 associated with one or more gaming facilities may include one or more networked gaming machines 100 ("electronic gaming machines" or "EGM's") connected in the network by suitable network cable or wirelessly. Networked gaming machines 100 (EGM1-EGMn) and one or more overhead displays 313 may be operatively connected so that the overhead display or displays may mirror or replay the content of one or more displays of gaming machines 100. For example, the primary display content for a given gaming machine 100 may be stored by a display controller or game processor 205 of the given gaming machine and transmitted through network controller 210 to a controller associated with the overhead display(s) 313. In the event gaming machines 100 have cameras installed, the respective player's video images may be displayed on overhead display 313 along with the content of the player's gaming machine display.

The example gaming network 300 shown in FIG. 3 includes a host server 301 and floor server 302, which together may function as an intermediary between floor devices such as gaming machines 100 and back office devices such as the various servers described below. Game server 303 may provide server-based games and/or game services to network connected gaming devices such as gaming machines 100. Central determinant server 305 may be included in the network to identify or select lottery, bingo, or other centrally determined game outcomes and provide the information to networked gaming machines 100 which present the games to players.

Progressive server 307 may accumulate progressive prizes by receiving defined amounts, such as a percentage of the wagers from eligible gaming devices or by receiving funding from marketing or casino funds. Progressive server 307 may also provide progressive prizes to winning gaming devices in response to a progressive event. Such a progressive event may comprise, for example, a progressive jackpot game outcome or other triggering event such as a random or pseudo-random win determination at a networked gaming device or server. Accounting server 311 may receive gaming data from each of the networked gaming devices, perform audit functions, and provide data for analysis programs. Player account server 309 may maintain player account records, and store persistent player data such as accumulated player points and/or player preferences (for example, game personalizing selections or options).

Example gaming network 300 also includes a gaming website 321 which may be hosted through web server 320 and may be accessible by players via the Internet. One or more games may be displayed as described herein and played by a player through a personal computer 323 or handheld wireless device 325 (for example, a Blackberry® cell phone, Apple® iPhone®, personal digital assistant (PDA), iPad®, etc.). To enter website 321, a player may log in with a user name that may, for example, be associated with the player's account information stored on player account server 309. Once logged onto website 321 the player may play various games on the website. Also website 321 may allow the player to make various personalizing selections and save the information so it is available for use during the player's next gaming session at a casino establishment having the gaming machines 100.

It will be appreciated that gaming network 300 illustrated in FIG. 3 is provided merely as an example of a gaming network in which games featuring free play control according to embodiments of the present invention may be implemented, and is not intended to be limiting in any way. The invention is not limited to use in games offered through a gaming network (via the gaming website 321, or via gaming machines such as gaming machines 100, or otherwise). For example, games including free play control according to the present invention may be offered through a stand-alone gaming machine having a configuration similar to gaming machine 100 or having any other gaming machine configuration. Also, where games including free play control as described particularly below in connection with FIGS. 4-8 are offered through gaming machines included in a gaming network, the network need not have the configuration shown for purposes of example in FIG. 3. In particular, servers shown separately in the example of FIG. 3 may be combined in a single physical processing device, or the processing duties of the various illustrated servers may be split into additional physical devices.

FIG. 4 illustrates an example process within the scope of the present invention. The process shown in FIG. 4 from process block 402 through 432 represents a single game play sequence according to one form of the invention and thus may be repeated for each respective wager placed in the wagering game. The illustrated process applies particularly to a reel-type wagering game which employs a number of mechanical (or video-generated) reels which each carry game symbols used to show results of a play. The reels are spun and then brought to a stop to show a respective game symbol at each symbol location of a matrix. Other types of games may also employ the process shown in FIG. 4, including video playing card games. The following paragraph will describe the overall process shown in FIG. 4 and then subsequent paragraphs will describe the individual process steps in greater detail, and describe certain variations on these steps.

As shown at process block 401, the electronic gaming machine (such as gaming machine 100 in FIGS. 1-3) is first initialized for game play. Once the gaming machine is initialized, the process may include receiving a game play input (including a wager) as indicated at process block 402, and then displaying a result for that play of the wagering game as shown in process block 404. Once the result of the play is displayed in the form of a matrix of game symbols in a reel-type game or otherwise, or at least once the result to be displayed is known, the process evaluates the displayed result for any wins or any event that would prompt the award of free plays as indicated at process block 406. The then process continues to apply the applicable pay table as indicated at process block 408, and then award prizes defined in the pay table for any detected winning aspect of the displayed result as indicated at process block 410. If no free play triggering event is detected as indicated by a negative outcome at decision box 412 the game play sequence would end for that play of the wagering game. However, if a free play triggering event is detected as indicated by an affirmative outcome at decision box 412, the process branches to award and conduct the free play or plays. In particular, FIG. 4 shows awarding free plays at process block 414, displaying the result for each free play at process block 416, and then evaluating the displayed results for wins as indicated at process block 418. The illustrated process includes applying the applicable pay table to identify any prizes won in the displays produced for the free plays as indicated at process block 420, and then awarding any such prizes as indicated at process block 422. A secondary game is then conducted as shown at process block 424 and the displayed secondary game result is evaluated as shown at process block 426. If the result of the secondary game is an additional free play triggering result as indicated by an affirmative outcome at decision box 428, the process branches to optionally modify the parameters for the additional free plays as shown at process block 430, and then loops back to award the additional free plays at process block 414 and repeat the rest of the free play process. However, when the result of the secondary game is not an additional free play triggering result as indicated by a negative outcome at decision box 428, the process continues to award any prize for the secondary game result as shown at process block 432, and then the process terminates for the game play sequence. As noted above, the process steps from 402 to 432 may be repeated for each subsequent game play input by the player in a gaming session at the gaming machine.

The process of initializing a gaming machine for play of the game as indicated at process block 401 may include a number of different steps depending upon the nature of the gaming machine and the gaming network in which the gaming machine may be included. For example, many modern gaming machines may require a player login to initialize the gaming machine for play. This login may include receiving a player identifier at the gaming machine in some fashion either through a card reader or other reading device or input device at the gaming machine. Other gaming machines may require no player login, but may require the player to insert cash or credits into the gaming machine in some fashion to initialize the gaming machine for play. For example, in ticket-in-ticket-out systems, a player may be required to insert a ticket into a ticket reader at the gaming machine to place credits on the gaming machine to facilitate play. Where the gaming machine accepts cash, the initialization process may include receiving cash from the player. Process block 401 is included in FIG. 4 simply to indicate that typically the gaming machine must be initialized for game play in some fashion, but is not intended to limit the invention to any particular type of initialization.

In some forms of the invention the process of initializing the gaming machine for play as indicated at process block 401 causes the gaming machine to display a symbol display area on a symbol display device of the gaming machine. The symbol display area includes a number of symbol locations for a wagering game. The state of this symbol display area (that is, the particular game symbols displayed in the symbol locations) may simply be left over from the immediately preceding game play sequence. In other embodiments, the state of the symbol display area may be left over from an attract sequence executed by the gaming machine to attract a player to that particular machine. Yet other forms of the invention may return the symbol display area to a particular starting condition for each play of the game.

The game play input received as indicated at process block 402 may include receiving a number of separate inputs to initiate the play of the game. For example, a player may be required to select a bet level for the play and/or may be required to select which symbol location combinations (paylines in reel-type games) are active for the given play. The present invention is not limited to receiving any particular input or inputs to initiate the play of the game. Unless stated specifically otherwise, for the purpose of this disclosure and the following claims, the step of receiving a game play input includes receiving any single input or sequence of inputs to initiate the play of the wagering game.

The process of displaying the game play result at process block 404 may be accomplished in a number of different ways within the scope of the present invention. Where the gaming machine includes mechanical reels, the result may be displayed by spinning the reels and then bringing each reel to a stop to show a respective game symbol at each symbol location. Video reel-type games include a video simulation of reels (which may be shown on video display device 104 in FIG. 1 for example) which spin and then come to a stop to show various game symbols in the symbol location matrix. The invention is not limited to any particular reel arrangement, for either a mechanical reel or video reel implementation. The invention is also not limited to video-type games which simulate mechanical reel games. For example, the present free play control process may be implemented for wagering games in which results are displayed by playing card hands, such as in video poker games. The present invention encompasses any process for displaying the result in the game as indicated at process block 404 in FIG. 4.

It should be appreciated that where the result displayed at process block 404 is displayed through a matrix of game symbols (as in reel-type and video poker games), some forms of the invention may not change all of the symbols for given play of the game. For example, one or more of the mechanical or video-generated reels may remain stationary for a given play. Such stationary reels may be selected randomly, may be selected under the control of the player in some fashion, may be selected based on a previous play of the game, or may be selected in any other fashion. Where the player may select symbol locations to remain constant over the course of the given play of the game, the selection may be part of the game play input at process block 402, for example. Also, the step of displaying the game play result at process block 404 may include a series of substeps to reach a final display. In a reel-type game for example, the step at process block 404 in FIG. 4 may include first spinning all of the reels of the game and bringing them all to a stopped position to show an initial matrix of game symbols. Once this initial matrix of game symbols is displayed, the player may be allowed to select one or more reels to respin or one or more reels to lock, with the remaining reels being respun. As another example, video poker implementations may include one or more card draws to reach a final result for the play displayed at process block 404.

Where the result displayed at process block 404 is displayed by a matrix of game symbols, the invention is not limited to any particular arrangement for selecting the game symbols to be displayed in the various symbol locations of the symbol location matrix for a given play of the game. For reel-type games each reel may be associated with a weighting that defines the probability of landing at a given angular orientation on a given play of the game. The reel weighting may include an overall numeric range made up of a respective numeric subrange for each symbol on the reel. Each numeric subrange is selected to provide the desired fraction with respect to the overall numeric range. This desired fraction represents the probability of the reel stopping at a stop position showing that reel symbol. For each play of the game, either the play displayed at process block 404 or the display of a free play at process block 416, the symbol to display at the stop position for the given reel may be obtained by generating a random number within the overall numeric range, and then identifying the numeric subrange in which that random number is included. The reel is then controlled to stop showing the reel symbol corresponding to that numeric subrange at the stop position for the reel.

It should be noted however that although the reel stop position determination technique described in the preceding paragraph represents a preferred technique for causing a reel in a reel-type game to stop in accordance with the invention, any other suitable technique may be employed to select game symbols. In a central determinant system, such as a central determinant bingo or electronic lottery system, for example, a given play of the game may be associated with one or more outcomes of the underlying game. In these cases, each reel may be forced to stop at the desired angular orientation to display game symbols consistent with the outcome of the underlying game or a random outcome selection. In other forms of the invention the outcome for a given play of the game is obtained in some fashion at the gaming machine itself and the reels are forced to stop showing game symbols consistent with the outcome.

The process of evaluating the game play result as shown in process block 406 in FIG. 4 may be accomplished in any suitable fashion. Where the result is displayed in the form of a matrix of game symbols, the evaluation may involve comparing the various game symbols in the game symbol matrix to the winning symbol combinations defined in the applicable pay table for the game to determine if a given displayed game symbol matrix matches any of the winning symbol combinations defined in the pay table. For reel-type games, the game symbols appearing in the game symbol matrix may be apparent from the angular position of the reel or virtual reel, or may be apparent from the result which forces the reels to stop at the given positions. Alternatively, each winning symbol combination defined in the pay table may be correlated to a set of reel stop positions which produce the symbol combination, and these reel stop positions may be stored in a data table. In this alternative, the evaluation may include comparing the reel stop positions for the game symbol matrix to the stored reel stop positions to identify a match. Such a match indicates that the game symbol matrix produces the winning symbol combinations or combinations correlated to the matched reel stop positions. For poker type games, the evaluation at process block 406 may involve comparing the cards in the final hand with a pay table which assigns a prize to each hand in the hierarchy of playing card hands.

The same techniques may be applied to performing the evaluation according to process block 418. However, in the case of process block 418, the applicable pay table may or may not be the same pay table applied in the evaluations indicated at process block 404.

In the example process shown in FIG. 4, the evaluation at process block 404 may also include an evaluation to determine if a free play triggering event has occurred in the play of the wagering game. The present invention is not limited to any particular type of free play triggering event. Such an event may comprise a certain symbol combination in the case of games for which results are displayed by a matrix of game symbols. A free play triggering event may be randomly generated separate or partially separate from producing the display at process block 404, according to a schedule, or in any other fashion. As will be described below in the example of FIG. 6, a free play triggering event may be defined as a combination of one or more symbols scattered across the matrix of symbol locations of a reel-type game.

Regardless of how the free plays are triggered, the process of awarding the free plays as indicted at process block 414 may include producing some display at the gaming machine to indicate to the player that they are entitled to some number of free plays. Such a display may include a numerical or analog meter displayed through the gaming machine display system indicating the number of free plays remaining. The award of free plays indicated at process block 414 may also include placing the gaming machine in a free play state in which plays of the wagering game are conducted without a wager as is required for the initial play for which the result is displayed at process block 404.

Displaying the result for each free play at process block 416 may be performed in the same fashion as displaying the result at process block 404. Subject to certain variations in the parameters for the free games, it will be appreciated that some preferred forms of the invention employ the same game for the free plays as for the initial play that prompted the result display at process block 404. For example, where the initial play was for a reel-type game, each free play will be a play in that same reel-type game, and where the initial play was for a playing card game, each free play will be a play in that same playing card game. Each free play may be conducted in response to a player input, or one or more of the free plays may be conducted automatically without requiring any separate player input to initiate any of the free plays.

The process of applying the pay table or pay tables according to process blocks 408 and 420 may involve any process suitable for the given type of game. For example, where wins are defined by winning game symbol combinations displayed in a matrix of symbol locations, each winning symbol combination detected at process blocks 406 and 418 may be associated with a prize value through a suitable data table. In this case, applying the pay table involves reading the associated prize value from the data table and adding that winning prize amount (in the applicable units) to a total amount for that play of the game. This total amount in credits, currency, physical merchandise (or vouchers for such merchandise), or combinations of these or other units may then be awarded to the player in a suitable manner according to the steps at process blocks 410 and 422.

The prizes that may be awarded in accordance with process blocks 410, 422, and 432 may be awarded in any particular fashion consistent with the particular gaming machine and gaming system. For example, prizes are awarded in some gaming machines by increasing the credit value on the gaming machine and the player may cash out from that gaming machine to obtain value for those credits. Other types of gaming systems maintain an account for the player's play at a remote accounting system, and the prizes are awarded by crediting the player's remote account and showing the updated account value at the gaming machine. Some types of prizes may be hand pay prizes which require a casino employee to manually deliver the prize or a voucher for the prize to the player. Hand pays are typically required for high-value prizes or for prizes in the form of merchandise or coupons. Other types of gaming machines may physically dispense prizes in the form of coins or other value. The invention is not limited to any particular system or arrangement for awarding the prizes for wins according to the applicable pay table or pay tables for the game. The invention is also not limited to any temporal order for awarding the prizes. One preferred order includes first awarding prizes in accordance with process block 410, then in accordance with process block 422 for each free play, and finally in accordance with process block 432. However, other implementations may hold all awarding steps until all prizes are known, and then may award all of the prizes in descending order of value, or in any other order.

In some implementations of the invention, there may be multiple winning aspects of a result displayed at process block 404 or at process block 416 in FIG. 4. For example, reel type games such as the example reel-type game described below in connection with FIG. 6 may include multiple paylines which may be activated on a given play of the game. In these multiple payline games, each win along a given payline represents a separate winning aspect of the game result. The prizes awarded at process blocks 410 and 422 are awarded for all winning aspects of the respective game.

The process flow shown through process blocks 416, 418, 420, and 422 in FIG. 4 suggest that all of the free play results are displayed, all of the displayed results are evaluated, the pay table is applied to all of the displayed results, and then any prizes are awarded. Although embodiments of the invention may be implemented in this illustrated fashion, other embodiments may perform the sequence of steps through process blocks 416, 418, 420, and 422 separately for each free play. That is, either in response to a player input or otherwise, a result for a first free play may be displayed at process block 416, then that result may be evaluated for wins, and the pay table may be applied to identify prizes, and the prizes for that play may then be awarded. This sequence may then be repeated for each of the free plays until the sequence has been performed for all of the free plays that have been awarded to that point.

The secondary game displayed as indicated at process block 424 may be any suitable game which includes as potential results an additional free play triggering result and at least one result that is not a free play triggering result. In one preferred embodiment, the secondary game comprises a picking game in which three or more selectable objects are displayed to the player and the player is prompted to pick one of the objects. Each of the objects is secretly associated with a result in the secondary game, either a free play triggering result or a result that does not trigger additional free plays, so that the player's selection of one of the objects produces a result in the secondary game. Specifically, the player's selection of one of the objects produces the result which is associated with the selected object. Other games which may be used as the secondary game include reel-type games and playing card games for example. Regardless of the particular type of game used as the secondary game, the number of additional free plays which may be awarded may be a fixed number of free plays or different numbers of free plays based on the particular free play triggering result or any other aspect of the secondary game or any other factor.

The manner in which the secondary game is displayed as indicated at process block 424 is dependent upon the nature of the game. Where the secondary game is a player picking game as described above, the secondary game is displayed by displaying the selectable objects and displaying the player's selection. For example, the selectable objects may be images produced on a touch screen display and the player may select one of the objects by touching the location of the object on the screen. As another example, where the secondary game is a reel-type game, the game may be displayed through video-generated or physical reels at the gaming machine.

The evaluation which may be required at process block 426 will depend upon the nature of the secondary game. Where the secondary game is a player pick type game as described above, the evaluation may include merely reading the result associated with the object which the player has picked. Alternatively, the association between the selectable objects and the various available secondary game results may be dynamic and selected to enforce some probability of selecting each available result. In these embodiments, a random number may be generated and used to identify a result for the secondary game. The object selected by the player in the player pick game will then be shown as being associated with the result identified for that instance of the secondary game. In embodiments in which the secondary game comprises a reel-type game, the evaluation at 426 may comprise an evaluation as described above in connection with process blocks 406 and 418 for reel-type games. Generally, the evaluation indicated at process block 426 may be any evaluation necessary or desirable to identify the result for the secondary game.

In some forms of the invention, one or more of the secondary game results which do not trigger any additional free plays may be associated with a prize. Thus in these embodiments the process will include awarding the prize for the non free play triggering secondary game result as indicated at process block 432. The prize may be awarded in any suitable manner as described above in connection with the awarding steps shown at process blocks 410 and 422.

Forms of the invention which modify the free play parameters as indicated at process block 430 in FIG. 4 may make many different types of modifications. In some preferred embodiments, the modification may include increasing the expected value of each free play such as by increasing the probability of producing higher valued results in the game. For video-generated reel-type games, the modification may include adding more symbols which contribute to higher-paying symbol combinations, adding multipliers, or adding wild symbols for example. It should be noted that even in forms of the invention which modify the free play parameters, the modification need not be performed each time a free play triggering result is achieved in the secondary game. Rather, whether a modification is to be performed may be randomly determined, determined based in part on the result of the secondary game, or determined based on any other factors. Some forms of the invention may include an additional game, the result of which may modify the free play parameters for any further free plays which are awarded.

It may be desirable in some cases to place some limit on the number of free plays which may be awarded in a given play sequence shown in the process of FIG. 4. One way to limit the number of free plays that may be awarded from the secondary game in a play sequence is to eliminate any additional free play triggering result from the potential results available in a given instance of the secondary game. For example, the process may include maintaining a count of the number of instances of the secondary game in a play sequence, and may eliminate any free play triggering result in the secondary game once a predetermined count is reached. Depending on the nature of the secondary game, it may also be possible to decrease the probability of obtaining an additional free play triggering result for an instance of the secondary game, perhaps after a certain number of secondary game cycles have been performed in a given play sequence.

Figure 5:
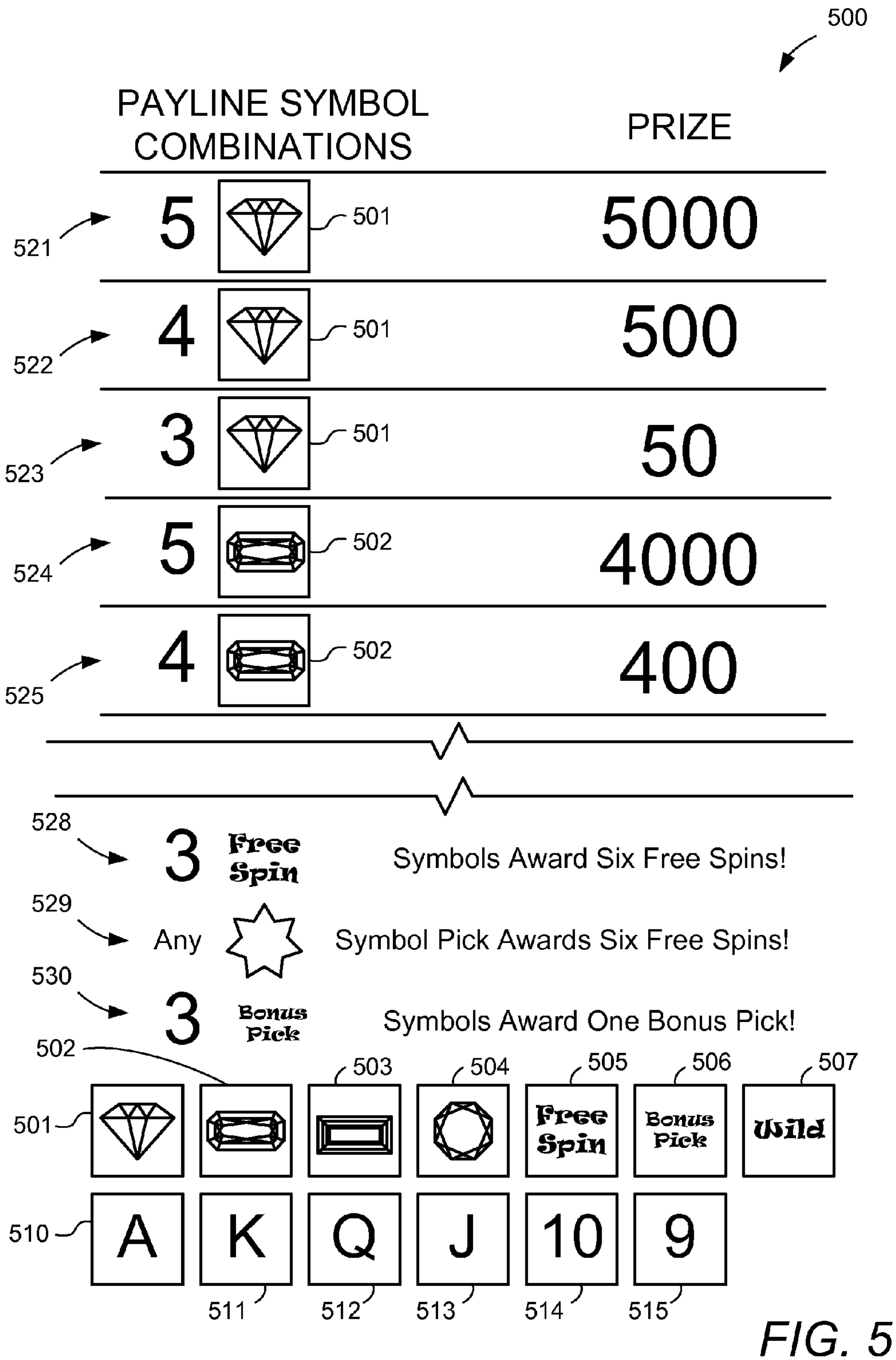
FIG. 5 is a representation of a portion of a pay table that may be defined for a reel-type game according to the present invention.
Figure 6:
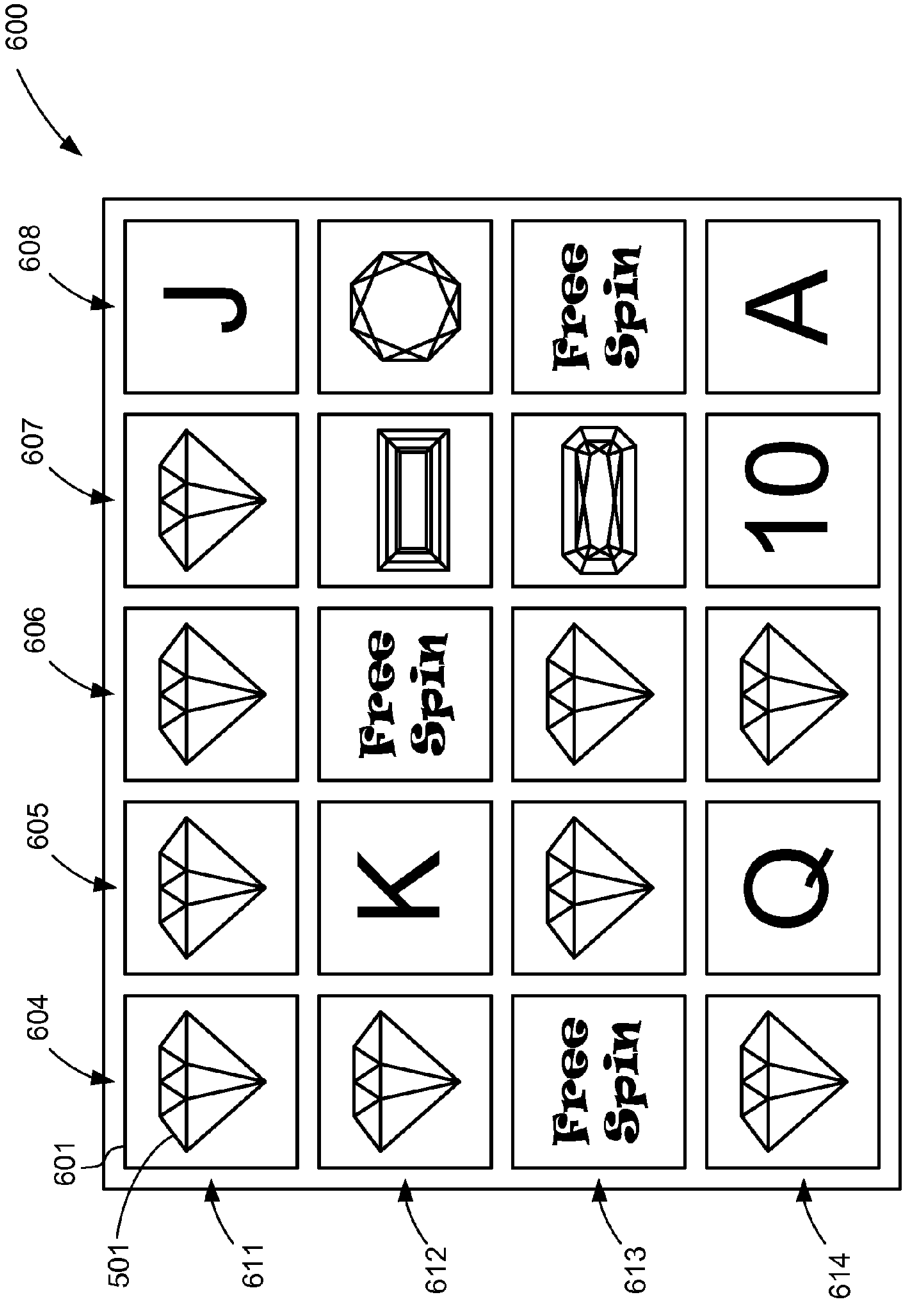
FIG. 6 is a representation of a game symbol matrix that may be formed in a play of a wagering game in an embodiment of the present invention, the game symbol matrix showing a free play triggering result.
Figure 7:
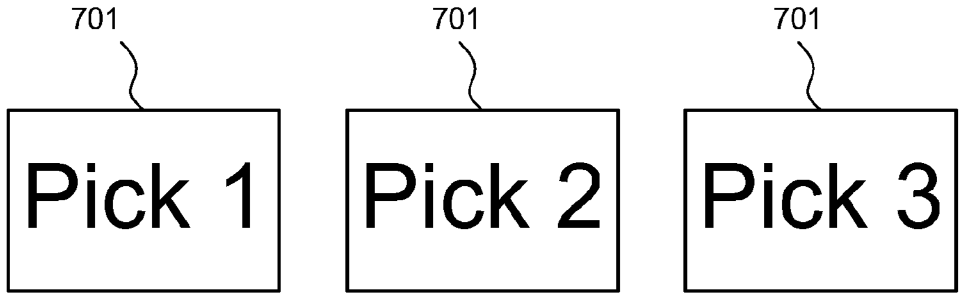
FIG. 7 is a representation of a secondary game according to an embodiment of the present invention.
Figure 8:
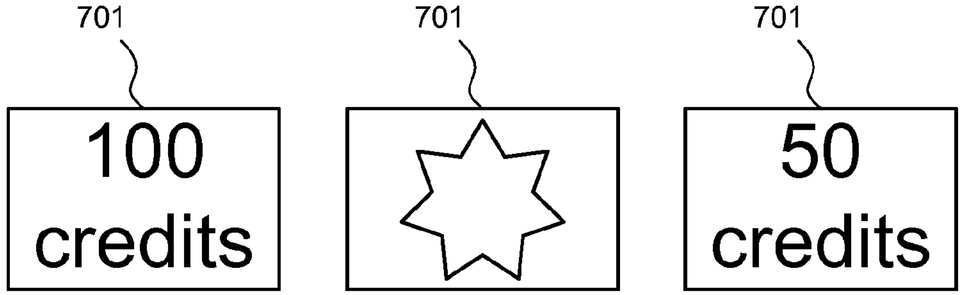
FIG. 8 is a representation of the secondary game of FIG. 7, but showing all of the potential results revealed

FIGS. 5 though 8 all relate to a reel-type game which may apply free play control according to the present invention. FIG. 5 comprises a portion of a pay table 500 which may be defined for the reel-type game. FIG. 6 comprises a representation of a result in the reel-type game which results in the award of free plays as indicated at process block 414 in FIG. 4. FIGS. 7 and 8 each comprises a representation of a secondary game which may be conducted according to process block 424 in FIG. 4.

Pay table 500 in FIG. 5 shows all of the reel symbols which may be used to populate the various symbol locations of a game symbol matrix which displays results in the reel-type game. The symbol set used in this example includes four different gem symbols, a diamond symbol 501, a ruby symbol 502, an emerald symbol 503, and a sapphire symbol 504. The symbol set also includes a "free spin" (free play) symbol 505, a "bonus pick" symbol 506, and a "wild" symbol 507. The symbol set further includes the symbols Ace ("A") 510, King ("K") 511, Queen ("Q") 512, Jack ("J") 513, ten ("10") 514, and nine ("9") 515. Of course, the invention is by no means limited to this number or these types of game symbols. These symbols simply provide an example to better illustrate the present invention. The portion of pay table 500 shown in FIG. 5 shows five lines, lines 521-525 of winning symbol combinations defined for the game. For example, line 521 defines the winning combination of five diamond symbols 501 correlated with a prize of 5000 units, line 522 defines the winning combination of four diamond symbols 501 correlated to the prize of 500 units, and line 525 defines the winning combination of four ruby symbols 502 correlated with the prize of 400 units. It will be appreciated that the pay table continues on with other definitions of winning subset combinations made up of the emerald symbol 503, the sapphire symbol 504, and the playing card-based symbols, however, these additional winning combinations are omitted from FIG. 5, so as not to obscure the present invention in unnecessary detail. Pay table 500 also defines three special prizes. Prize definition 528 indicates that three of the free spin symbols 505 on a given play of the game awards six free spins. Prize definition 529 indicates that if the star symbol is picked during a picking game implemented with the reel-type game, the symbol entitles the player to six free spins. Finally, the prize definition 530 in FIG. 5 indicates that three "bonus pick" symbols 506 appearing in the symbol array for a given play entitles the player to one bonus pick. Where the game symbols are shown on a video display device for the reel-type game, the bonus pick may be implemented as a pick of one of the three "bonus pick" symbols 506 in the game symbol matrix, and the result of the pick may be displayed either at that location or elsewhere in the display system for the gaming machine (which may be of the type shown in FIGS. 1 and 2).

FIG. 6 shows a matrix 600 of symbol locations 601 for a reel-type game using the game symbol set and definitions shown in example pay table 500 shown in FIG. 5. It may be assumed for purposes of this example that the symbol locations 601 are populated using five reels aligned along a horizontal rotational axis in the orientation of the figure. When in a stop or zero position, each respective reel displays a vertical column of four game symbols. The first reel provides a column 604 of game symbols, the second reel provides column 605, the third reel provides column 606, the fourth reel provides column 607, and the fifth reel provides column 608. The columns of symbol locations are aligned to form four horizontal rows of symbol locations, rows 611-614. This example matrix 600 thus comprises a 4×5 matrix of symbol locations, with each location populated with a respective game symbol. It may be assumed that the paylines for matrix 600 are defined as the four horizontal rows 611-614.

The game symbols populating matrix 600 in FIG. 6 may be selected using any of the techniques described above in connection with process block 404 in FIG. 4. Regardless of how the various symbol locations 601 were populated, the resulting matrix 600 produces a winning combination of four diamond symbols 501 along the payline comprising row 611 and a winning combination of three "free spin" symbols 505. These winning symbol combinations are shown in pay table 500 in FIG. 5 at lines 522 and 528, and are correlated to prizes of 500 units and six free plays of the game, respectively.

The example secondary game shown in FIG. 7 comprises a player pick-type game which may be presented to a player in accordance with process block 424 of FIG. 4. In this secondary game, three selectable objects 701 are displayed to the player using a suitable display device at the gaming machine labeled "Pick 1," "Pick 2," and "Pick 3." It will be appreciated that these textual labels are provided just for simplicity and that implementations may use any type of graphic symbol or representation for the various player selectable objects. Of course, the invention is not limited to three player selectable objects as shown in FIG. 7. Rather, any number of such objects may be displayed, provided there are at least two.

FIG. 8 shows an example in which the result associated with each player selectable object 701 in FIG. 7 has been revealed. In this example, if a player had picked the middle object 701 in FIG. 7, they would have been awarded six additional free plays according to prize definition 529 in the pay table 500 of FIG. 5. Referring to FIG. 4, the process would have branched from decision box 428 to process block 430 and then back to block 414 for this additional free play result. The secondary game results which do not trigger additional free plays are each associated with a credit value. If either of these had been selected, the process in FIG. 4 would have branched from decision box 428 to process block 432 to award the indicated prizes.

Implementations of the invention providing free play control according to the present invention are certainly not limited to the examples described above in connection with FIGS. 5 through 8. Rather, embodiments of the invention are subject to wide variation within the scope of the following claims. For example, alternatively to the assumed five-reel, multi-symbol per reel configuration shown in the figures, at least some symbol locations may be shown with a separate reel which populates only that symbol location. It is also possible within the scope of the present invention that arrangements other than side-by-side vertically oriented reels may be used to populate the various symbol locations with a respective game symbol. Reels may be arranged to spin about a vertical axis, or spinnable wheels may be arranged to populate the symbol locations. Also, arrangements of game symbols that travel in noncircular paths may be used to populate the symbol locations. Of course, embodiments of the invention are not limited to a 4×5 matrix or any particular number of multiple row and multiple columns.

Other variations from the examples of FIGS. 5 through 8 may be associated with the pay table and with the game symbols used to populate the various symbol locations. For example, embodiments of the invention may also include scatter pays which define credit prizes in terms of some number of symbols or symbol combinations appearing at any symbol locations in the matrix, and not just symbol combinations aligned along a payline. Also, the invention is not limited to any symbols or symbol groups. Some implementations may use different symbol groups for populating different symbol locations in the symbol location matrix. For example, rather than a universal set of game symbols such as that described above, some reels of a reel type game may include only a subset of the game symbols used in the game.

It will also be appreciated that processes according to the present invention are not limited to plays in a primary game offered through a gaming machine. Rather, the free play control technique shown in FIG. 4 may be applied to secondary games, bonus games, and other levels and types of games available through the gaming machine which may award one or more free games. For example, pay table 500 defines any pick of the star symbol as awarding six free plays, and awards a player pick for any three "bonus pick" symbols 506 appearing in the game symbol matrix for a particular play. With these definitions, it is possible for a player to enter a game play input and obtain a game symbol matrix for that play that does not directly award free plays, but awards a bonus pick. The player's bonus pick may reveal the star symbol which entitles the player to six free plays. In this case the game play result display at process block 404 in FIG. 4 will be the display of the bonus pick game, and revealing the star would represent the free play triggering event which entitles the player to free games via process block 414.

Free play control according to the present invention is not limited to reel-type games such as those used as examples above. Other implementations of the invention may be applied to playing card games or other wagering games.

Although example implementations of the invention are described above mostly in terms of standalone games, it should be appreciated that the invention may be applied in any number of different gaming environments and/or in combination with other games. For example, games providing free play control according to the present invention may be used as in-revenue or out-of-revenue tournament games or in side action games that are played in parallel or concurrently with one or more other games. Games employing the free play control techniques disclosed herein may also be employed as community games in which results at one gaming machine affect a community of one or more other players at different gaming machines. Games employing the present free play control techniques may also employ additional features to enhance the player's gaming experience. For example, players may be allowed to save game symbols from one play (including trigger symbols) and apply the saved symbols to another play. This may be accomplished by freezing one or more reels for a given play of a reel-type game. Also, games employing free play control according to the invention may incorporate progressive prizes. For example, one or more prizes in the applicable pay table may comprise a respective progressive prize. Avatars are among other game features which may be used in connection with games employing free game control. Trailing touch screen graphic effects such as those disclosed in U.S. Patent Application Publication No. 2012/0115599 may also be incorporated in games employing free play control as disclosed herein.

As used in the foregoing description and the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above-described example embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for controlling free plays awarded in a wagering game conducted through a gaming machine, the method including:

(a) receiving a wager for a play in the wagering game, the wager being received through a player input system of the gaming machine and correlating to a respective wagering game play sequence;

(b) displaying a result for the play in the wagering game through a display system for the gaming machine;

(c) in response to a free play triggering event in the play in the wagering game, awarding one or more free plays of the wagering game, each free play requiring no wager;

(d) through the display system, displaying a respective result in the wagering game for each awarded free play for which a respective result has not previously been displayed;

(e) through the display system, displaying a secondary game and secondary game result obtained for the secondary game from among a number of potential secondary game results, the secondary game being displayed after a respective result has been displayed for each respective awarded free game play at step (d) of this claim, and the potential secondary game results including at least one additional free play triggering result and at least one result that does not trigger any additional free play;

(f) for a respective additional free play triggering result obtained in the secondary game, awarding one or more free plays of the wagering game and conducting steps (d), (e), and (f) of this claim in that order for the respective one or more free plays awarded for the respective additional free play result;

(g) for a respective result in the secondary game that does not trigger any additional free play, ending the respective wagering game play sequence for the wager received at step (a) of this claim; and (h) awarding a prize at the gaming machine for each winning aspect of the result displayed for the play and for the respective result displayed for each free play.

2. The method of claim 1 wherein each potential secondary game result other than each additional free play triggering result is associated with a secondary game prize, and further including awarding the respective associated secondary game prize at the gaming machine for each potential secondary game result obtained in an instance of step (d) in claim 1 comprising a result that does not trigger any additional free play.

3. The method of claim 1 wherein the result for the play in the wagering game displayed at step (b) in claim 1 includes a bonus game result, and further including conducting a bonus game at the gaming machine in response to the bonus game result to obtain a result for the bonus game selected from among a number of potential results for the bonus game, and wherein at least one of the potential results for the bonus game comprises a bonus free game result which awards one or more free plays of the wagering game.

4. The method of claim 3 wherein the additional free game result in the secondary game and the bonus free game result in the bonus game are each associated with a common free play symbol which is defined in the wagering game as being associated with one or more free plays of the wagering game.

5. The method of claim 1 wherein the result displayed for each respective awarded free play at step (d) of claim 1 is selected from a set of potential results that does not include a result which awards further free plays of the wagering game.

6. The method of claim 1 further including for a respective additional free play result obtained at step (f) of claim 1, modifying a play characteristic of the wagering game.

7. The method of claim 6 wherein modifying the play characteristic of the wagering game includes increasing an expected payout for at least one awarded free play for which a respective result has not previously been displayed.

8. A gaming machine providing a wagering game, the gaming machine including:

(a) a display system;

(b) a player input system;

(c) at least one processor; and (d) at least one memory device storing instructions executable by the at least one processor to:

(i) receive a wager for a play in the wagering game, the wager being received through the player input system and correlating to a respective wagering game play sequence;

(ii) cause the display system to display a result for the play in the wagering game;

(iii) in response to a free game triggering event in the play in the wagering game, award one or more free plays of the wagering game, each free play requiring no wager;

(iv) cause the display system to display a respective result in the wagering game for each awarded free play for which a respective result has not previously been displayed;

(v) cause the display system to display a secondary game and secondary game result obtained for the secondary game from among a number of potential secondary game results, the secondary game being displayed after a respective result has been displayed for each respective awarded free game play at (d)(iv) of this claim, and the potential secondary game results including at least one additional free play triggering result and at least one result which does not trigger additional free plays;

(vi) for a respective additional free play triggering result obtained in the secondary game, award one or more free plays of the wagering game and conducting (d)(iv), (d)(v), and (d)(vi) of this claim in that order for the respective one or more free plays awarded for the respective additional free play result;

(vii) for a respective result in the secondary game that does not trigger additional free plays, end the respective wagering game play sequence for the wager received at step (d)(i) of this claim; and (viii) award a prize at the gaming machine for each winning aspect of the result displayed for the play and for the respective result displayed for each free play.

9. The gaming machine of claim 8 wherein each potential secondary game result other than each additional free play triggering result is associated with a secondary game prize, and wherein the instructions are also executable to award the respective associated secondary game prize at the gaming machine for each potential secondary game result obtained in an instance of element (d)(v) in claim 8 comprising a result that does not trigger any additional free play.

10. The gaming machine of claim 8 wherein:

(a) the result for the play in the wagering game displayed at element (d)(ii) in claim 8 includes a bonus game result;

(b) the instructions are also executable to cause the display system to display a bonus game at the gaming machine in response to the bonus game result and obtain a result for the bonus game selected from among a number of potential results for the bonus game; and (c) at least one of the potential results for the bonus game comprises a bonus free game result which awards one or more free plays of the wagering game.

11. The gaming machine of claim 10 wherein the additional free game result in the secondary game and the bonus free game result in the bonus game are each associated with a common free play symbol which is defined in the wagering game as being associated with one or more free plays of the wagering game.

12. The gaming machine of claim 8 wherein the result displayed for each respective awarded free play at (d)(vi) of claim 8 is selected from a set of potential results that does not include a result which awards further free plays of the wagering game.

13. The gaming machine of claim 8 wherein the instructions are also executable to, for a respective additional free play result obtained at (d)(vi) of claim 8, modify a play characteristic of the wagering game.

14. The gaming machine of claim 13 wherein modifying the play characteristic of the wagering game includes increasing an expected payout for at least one awarded free play for which a respective result has not previously been displayed.

15. A program product stored on one or more non-transitory computer readable data storage devices, the program product including:

(a) player input program code executable by at least one processor to receive a wager for a play in a wagering game, the wager being entered through a player input system of a gaming machine to initiate a play in a wagering game which displays results through a display system of the gaming machine;

(b) primary game program code executable by the at least one processor to (i) cause the display system to display a result for the play in the wagering game;

(ii) in response to a free game triggering event in the play in the wagering game, award one or more free plays of the wagering game, each free play requiring no wager; and (iii) cause the display system to display a respective result in the wagering game for each awarded free play for which a respective result has not previously been displayed;

(c) secondary game program code executable by the at least one processor to (i) cause the display system to display a secondary game and secondary game result obtained for the secondary game from among a number of potential secondary game results, the secondary game being displayed after a respective result has been displayed for each respective awarded free game play at (b)(iii) of this claim, and the potential secondary game results including at least one additional free play result and at least one result that does not trigger any additional free plays; and (ii) for a respective additional free play result obtained in the secondary game, award one or more free plays of the wagering game and conducting elements (b)(iii), (c)(i), and (c)(ii) of this claim in that order for the respective one or more free plays awarded for the respective additional free play result;

(iii) for a respective result in the secondary game that does not trigger any additional free plays, end the respective wagering game play sequence for the wager received at element (a) of this claim; and (d) payout program code executable by the at least one processor to award a prize at the gaming machine for each winning aspect of the result displayed for the play and for the respective result displayed for each free play.

16. The program product of claim 15 wherein:

(a) wherein the result for the play in the wagering game displayed at element (b)(i) in claim 15 includes a bonus game result; and (b) further including bonus game program code executable by the at least one processor to cause the display system to display a bonus game at the gaming machine in response to the bonus game result and obtain a result for the bonus game selected from among a number of potential results for the bonus game, and wherein at least one of the potential results for the bonus game comprises a bonus free game result which awards one or more free plays of the wagering game.

17. The program product of claim 16 wherein the additional free game result in the secondary game and the bonus free game result in the bonus game are each associated with a common free play symbol which is defined in the wagering game as being associated with one or more free plays of the wagering game.

18. The program product of claim 15 wherein the result displayed for each respective awarded free play at step (b)(iii) of claim 15 is selected from a set of potential results that does not include a result which awards further free plays of the wagering game.

19. The program product of claim 15 wherein the primary game program code is also executable to, for a respective additional free play result obtained at (c)(i) of claim 15, modify a play characteristic of the wagering game.

20. The program product of claim 19 wherein modifying the play characteristic of the wagering game includes increasing the expected payout for at least one awarded free play for which a respective result has not previously been displayed.

* * * * *